US010095690B2

(12) United States Patent
Lobez Comeras et al.

(10) Patent No.: US 10,095,690 B2
(45) Date of Patent: *Oct. 9, 2018

(54) AUTOMATED ONTOLOGY BUILDING

(71) Applicant: INTERNATIONAL BUSINESS MACHINES CORPORATION, Armonk, NY (US)

(72) Inventors: Jose Miguel Lobez Comeras, New York, NY (US); Nancy A. Greco, Lagrangeville, NY (US); Davide Pasetto, Bedford Hills, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,324

(22) Filed: Jun. 24, 2015

(65) Prior Publication Data

US 2016/0188564 A1    Jun. 30, 2016

Related U.S. Application Data

(63) Continuation of application No. 14/584,718, filed on Dec. 29, 2014.

(51) Int. Cl.
*G06F 17/27* (2006.01)
*G06F 17/28* (2006.01)
*G06F 17/30* (2006.01)

(52) U.S. Cl.
CPC ............ *G06F 17/28* (2013.01); *G06F 17/271* (2013.01); *G06F 17/2785* (2013.01); *G06F 17/30734* (2013.01)

(58) Field of Classification Search
CPC .... G06F 17/28; G06F 17/271; G06F 17/2785; G06F 17/30734
See application file for complete search history.

(56) References Cited

U.S. PATENT DOCUMENTS 5,794,249 A * 8/1998 Orsolini ............ G06F 17/30787
704/200
8,055,661 B2 11/2011 Lee et al.
(Continued)

FOREIGN PATENT DOCUMENTS

| CA | 2684397 A1 | 11/2008 |
| CN | 103218362 A | 7/2013 |
| WO | WO2009105114 A1 | 2/2008 |

OTHER PUBLICATIONS

Anonymously, "Methodology for Determining Similarity in Concepts using Ontology," An IP.com Prior Art Database Technical Disclosure; http://ip.com/IPCOM/000221083D; Aug. 2012. pp. 1-4.
(Continued)

*Primary Examiner* — Kevin Ky
(74) *Attorney, Agent, or Firm* — Tutunjian & Bitetto, P.C.; Jennifer R. Davis

(57) ABSTRACT

A method and system are provided for automated ontology building. The method includes creating contextual tokens from text, parsing the text into at least one parse tree, and calculating a dependency graph across the contextual tokens using the at least one parse tree. The method further includes generating concept instance candidates and parent-child relationships based on pattern matching and transformation of the at least one parse tree. The method also includes grouping concept instance candidates into concept candidates. The method additionally includes arranging the concept candidates into a tree having tree nodes and creating predicate-based relationships between the tree nodes based on patterns and predicates identified in the text. The method further includes scoring and sorting the tree nodes. The method also includes performing an analysis of the tree nodes and rebalancing the tree based on the analysis to provide an ontology based on the text.

13 Claims, 9 Drawing Sheets

(56) References Cited

U.S. PATENT DOCUMENTS

| | | | |
|---|---|---|---|
| 8,620,964 B2 | 12/2013 | Tsatsou et al. | |
| 8,747,115 B2 | 6/2014 | Lorge et al. | |
| 9,189,509 B1* | 11/2015 | Tsypliaev | G06F 17/30 |
| 2008/0275694 A1* | 11/2008 | Varone | G06F 17/2785 704/9 |
| 2009/0198642 A1* | 8/2009 | Akkiraju | G06N 5/02 706/54 |
| 2009/0234640 A1* | 9/2009 | Boegl | G06F 17/2785 704/9 |
| 2010/0306750 A1* | 12/2010 | Helovuo | G06F 8/456 717/143 |
| 2011/0225159 A1* | 9/2011 | Murray | G06F 17/30713 707/739 |
| 2013/0046771 A1* | 2/2013 | Moitra | G06F 17/30705 707/749 |
| 2013/0132365 A1* | 5/2013 | Chang | G06Q 30/0241 707/710 |
| 2013/0132442 A1* | 5/2013 | Tsatsou | G06F 17/30734 707/798 |
| 2013/0260358 A1* | 10/2013 | Lorge | G06F 17/30734 434/362 |
| 2014/0006861 A1 | 1/2014 | Jain et al. | |

OTHER PUBLICATIONS

Czejdo, B. et al., "Automatic Generation of Ontology Based Annotations in XML and their use in Retrieval Systems," Proceedings of the First International Conference on Web Information Systems Engineering, pp. 296-300, Vol. ; IEEE; 2000.
Hofford, G., "Structure Logic: A New Method that Enables Richer Meaning Representations," An IP.com Prior Databases Technical Disclosure; http://ip.com/IPCOM/000235703D. Mar. 2014. pp. 1-447.

* cited by examiner

AUTOMATED ONTOLOGY BUILDING

CROSS-REFERENCE TO RELATED APPLICATIONS

This application is a Continuation application of co-pending U.S. patent application Ser. No. 14/584,718, filed Dec. 29, 2014, which is incorporated herein by reference in its entirety.

BACKGROUND

Technical Field

The present invention relates generally to cognitive and contextual computing and, in particular, to automated ontology building.

Description of the Related Art

Due to the large amount of manual intervention involved as well as the exponential increase in data, the ability to build ontologies can be the rate limiting step with regard to advancing text analytics and progressing towards cognitive computing. Due to the massive amount of information involved, a human derived ontology may miss critical words or concepts that can alter the outcome of the analytics. As an end user creates an ontology by reading domain specific documents and papers, they may discover new concepts that need to be added such that refinement of the creation of the ontology becomes more manually intensive, resulting in driving up costs and manpower requirements, as well as affecting efficiency and accuracy.

SUMMARY

According to an aspect of the present principles, a method is provided for automated ontology building. The method includes creating contextual tokens from text, parsing the text into at least one parse tree, and calculating a dependency graph across the contextual tokens using the at least one parse tree. The method further includes generating concept instance candidates and parent-child relationships based on pattern matching and transformation of the at least one parse tree. The method also includes grouping concept instance candidates into concept candidates. The method additionally includes arranging the concept candidates into a tree having tree nodes and creating predicate-based relationships between the tree nodes based on patterns and predicates identified in the text. The method further includes scoring and sorting the tree nodes. The method also includes performing an analysis of the tree nodes and rebalancing the tree based on the analysis to provide an ontology based on the text.

According to another aspect of the present principles, a system is provided for automated ontology building. The system includes a contextual token recognizer for creating contextual tokens from text. The system includes a parser for parsing the text into at least one parse tree. The system further includes a dependency graph calculator for calculating a dependency graph across the contextual tokens using the at least one parse tree. The system also includes an instance generator for generating concept instance candidates and parent-child relationships based on pattern matching and transformation of the at least one parse tree. The system additionally includes a concept candidate identifier for grouping concept instance candidates into concept candidates. The system further includes a concept candidate based tree former for arranging the concept candidates into a tree having tree nodes and creating predicate-based relationships between the tree nodes based on patterns and predicates identified in the text. The system also includes a node scorer and sorter for scoring and sorting the tree nodes. The system further includes a tree rebalancer for performing an analysis of the tree nodes and rebalancing the tree based on the analysis to provide an ontology based on the text.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to automated ontology building.

In an embodiment, the present principles target the ability to rapidly discover and extract new concepts, build, iterate, and share ontologies, while expressing the concepts, individuals and relations in a knowledge representation graph that provides further insight and understanding of the semantic relationships that are explicitly mentioned in the supporting text. To dramatically reduce the manual processing involved, the present principles incorporate a high performance capability to find, ingest and digest documents and data across a diversity of formats, structures, and locations (web, database, etc.) and supply a user interface that allows for rapid insight (knowledge representation), editing (add, remove concepts, relations, documents, etc.) and discovery (new data, new topics as discovered through modeling, etc.). To achieve better accuracy and performance, specific new algorithms leverage state of the art Natural Language Processing (NLP) and build upon existing technologies to efficiently and accurately extract concepts and their semantic relationships.

Figure 1:
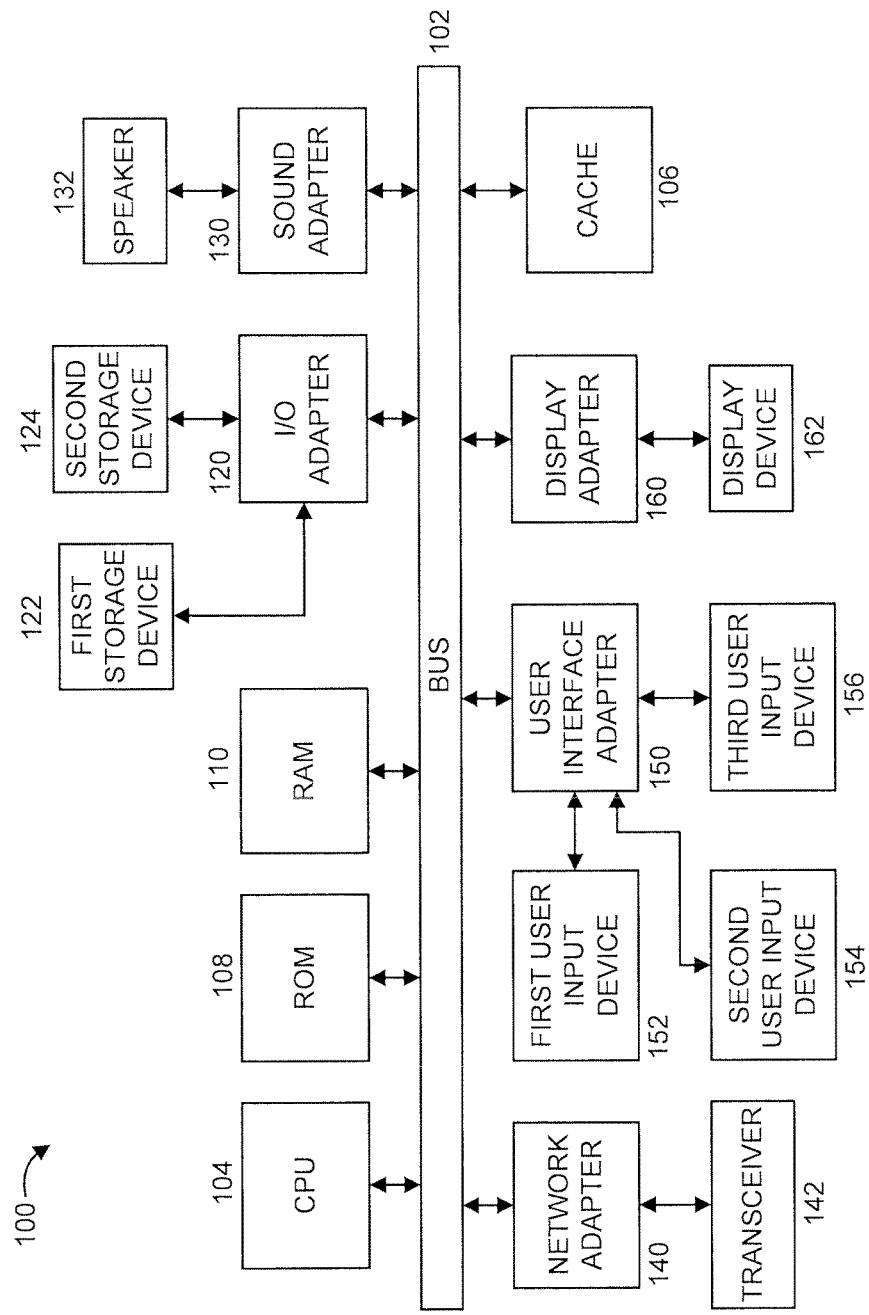
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
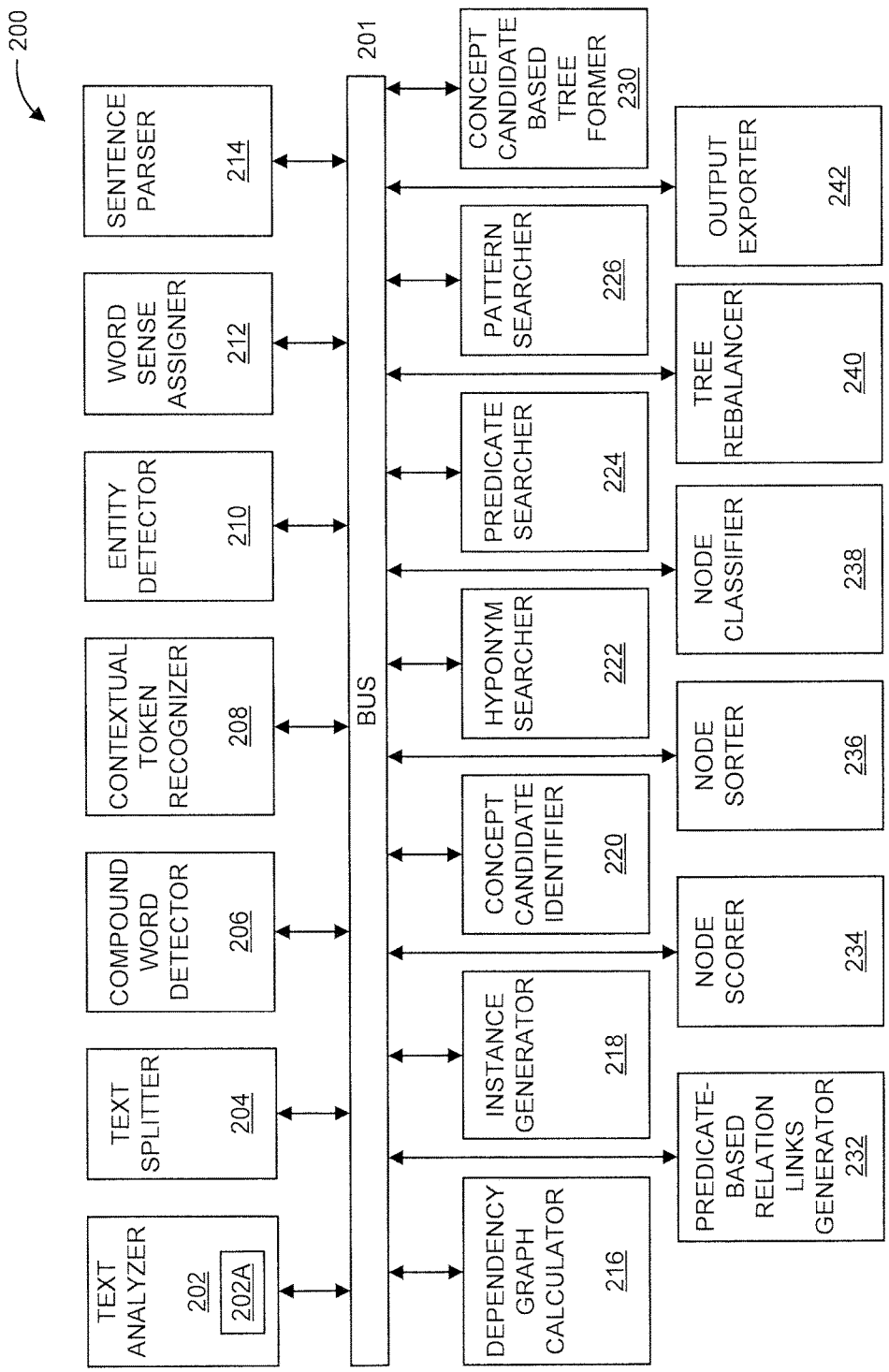
FIG. 2 shows an exemplary system 200 for automated ontology building, in accordance with an embodiment of the present principles.
Figure 3:
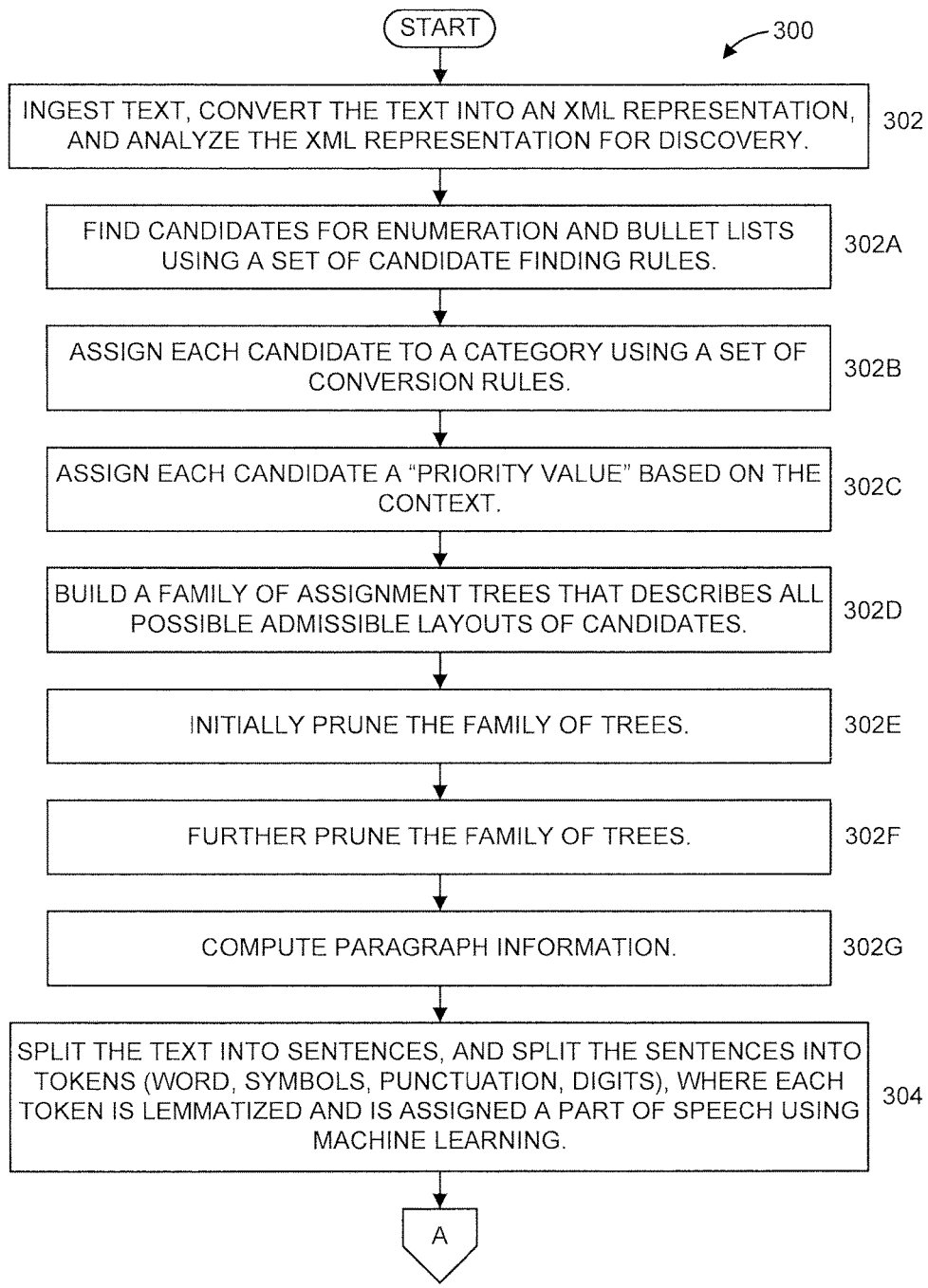
FIGS. 3-6 show an exemplary method 300 for automated ontology building, in accordance with an embodiment of the present principles.
Figure 4:
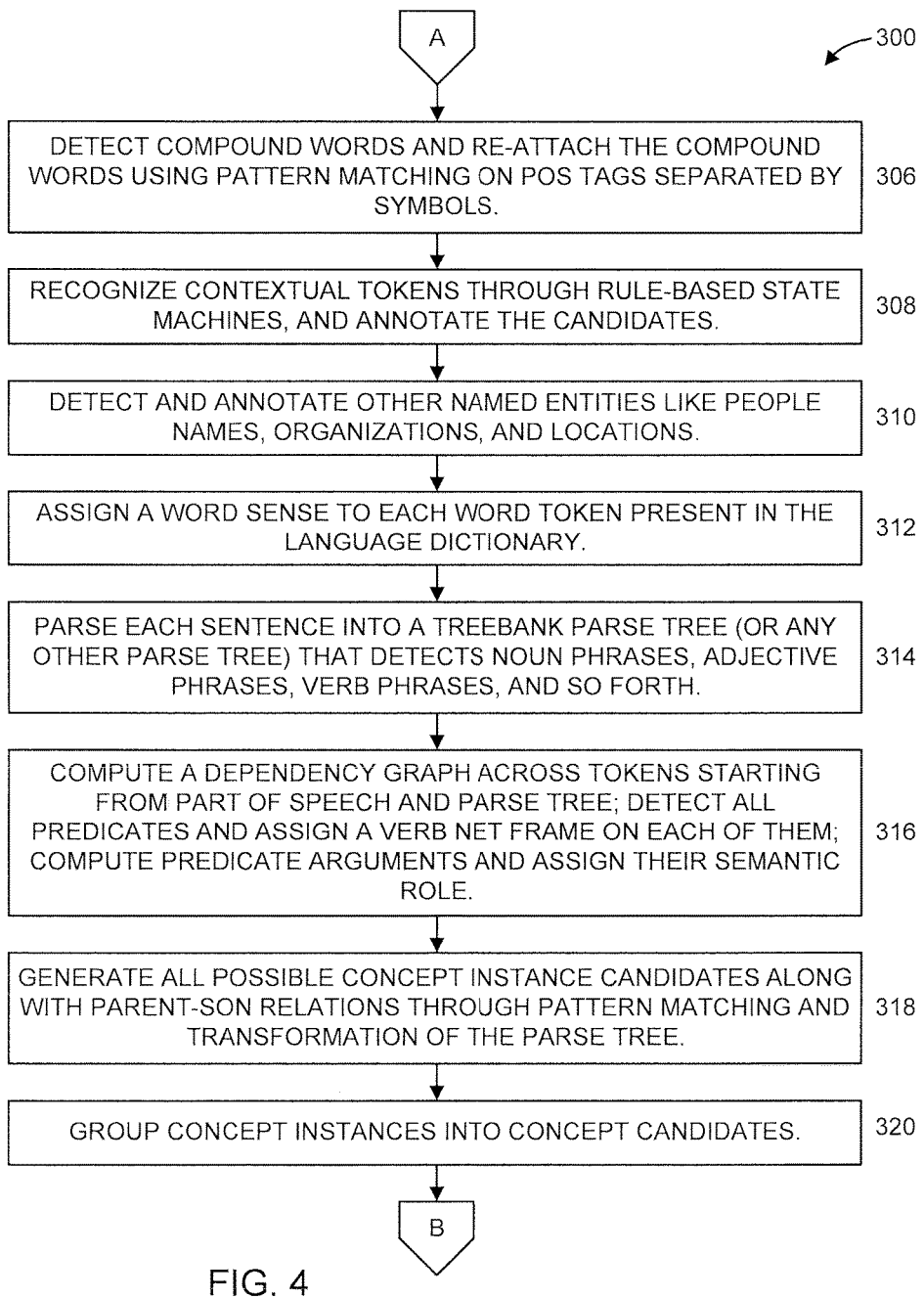
Figure 5:
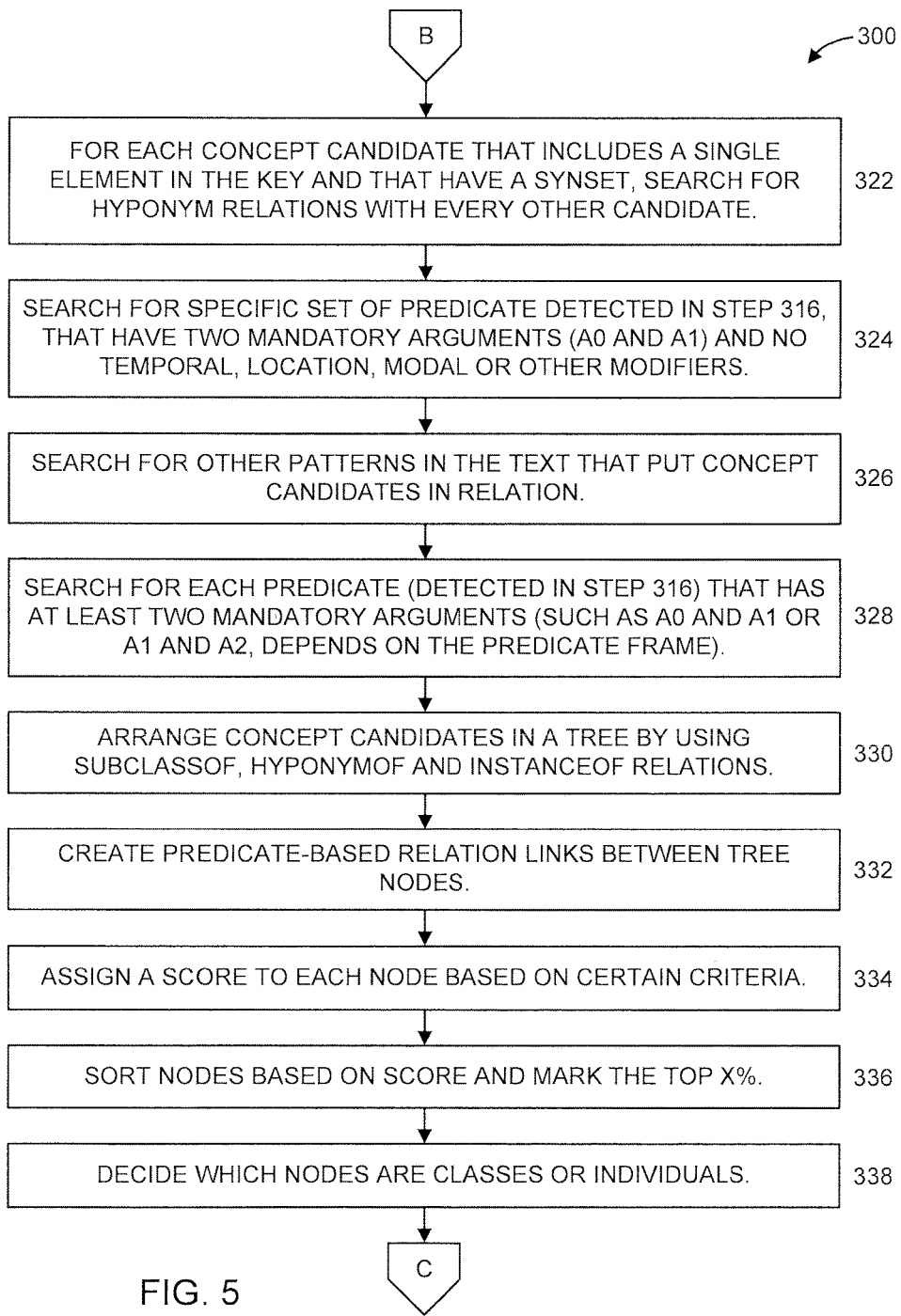
Figure 6:
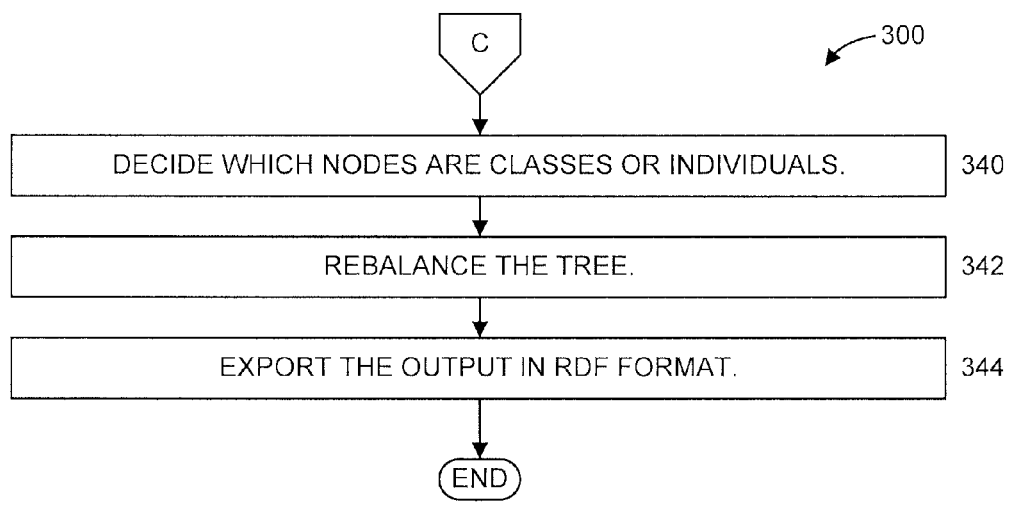

Moreover, it is to be appreciated that system 200 described below with respect to FIG. 2 is a system for implementing respective embodiments of the present principles. Part or all of processing system 100 may be implemented in one or more of the elements of system 200.

Further, it is to be appreciated that processing system 100 may perform at least part of the method described herein including, for example, at least part of method 300 of FIGS. 3-6. Similarly, part or all of system 200 may be used to perform at least part of method 300 of FIGS. 3-6.

FIG. 2 shows an exemplary system 200 for automated ontology building, in accordance with an embodiment of the present principles.

The system 200 includes a text analyzer 202, a text splitter 204, a compound word detector 206, a contextual token recognizer 208, an entity detector 210, a word sense assigner 212, a sentence parser 214, a dependency graph calculator 216, an instance generator 218, a concept candidate identifier 220, a hyponym searcher 222, a predicate searcher 224, a pattern searcher 226, a concept candidate based tree former 230, a predicate-based relation links generator 232, a node scorer 234, a node sorter 236, a node classifier 238, a tree rebalance 240, and an output exporter 242. The text analyzer 202 includes an enumeration and bullet list remove 202A. While the names of the preceding elements of system 200 are indicative of their respective functions, the particular operations of these elements are described with respect to method 300 and the steps corresponding thereto. Moreover, the term "enumeration" is intended to also include lists and related items.

In the embodiment shown in FIG. 2, the elements thereof are interconnected by a bus 201. However, in other embodiments, other types of connections can also be used. Moreover, in an embodiment, at least one of the elements of system 200 is processor-based. Further, while the node scorer 234, the node sorter 236, and the node classifier 238 are shown as separate elements, in other embodiments, two or more of these elements can be combined as one element. These and other variations of the elements of system 200 are readily determined by one of ordinary skill in the art, given the teachings of the present principles provided herein, while maintaining the spirit of the present principles.

FIGS. 3-6 show an exemplary method 300 for automated ontology building, in accordance with an embodiment of the present principles.

At step 302, ingest text, convert the text into an eXtensible Markup Language (XML) representation, and analyze the XML representation for discovery. In an embodiment, the XML representation can include font information (such as size, bold, italic, etc.) and paragraph information (when available). In an embodiment, the XML representation is analyzed to discover, for example, enumeration and bullet lists and layout paragraphs. In an embodiment, step 302 can be performed by text analyzer 202. In an embodiment, step 305 can include one or more of steps 302A through 302G.

At step 302A, find candidates for enumeration and bullet lists using a set of candidate finding rules. In an embodiment, the set of candidate finding rules can include, but is not limited to, the use of such regular expression conventions to locate a digit (/d), or whitespace character, (/s) or any variation on those conventions using regular expression quantifiers (for example adding + to indicate to search in a string for a match with the previous element one or more times, so the expression "/be+" would find candidate matches in the word "bent" finding "be", and also match to the word "been" finding "bee" or be + one more e). It is to be appreciated that the preceding candidate finding rules are merely illustrative and, thus, other candidate finding rules can also be used, while maintaining the spirit of the present principles.

At step 302B, assign each candidate to a category using a set of conversion rules. In an embodiment, the set of conversion rules can include, for example, but is not limited to, the following: DIGITS, LOWERCASE, UPPERCASE, ROMAN_NUMERALS, LETTER_SEQUENCE (e.g., i. ii. iii. iiii.). It is to be appreciated that the preceding conversion rules are merely illustrative and, thus, other conversion rules can also be used, while maintaining the spirit of the present principles.

At step 302C, assign each candidate a "priority value" based on the context. For example, if it is preceded by a full mark, it is higher priority than if it is preceded by letters or digits. It is to be appreciated that the preceding priority value is merely illustrative and, thus, other priority values can also be used, while maintaining the spirit of the present principles.

At step 302D, build a family of assignment trees that describes all possible admissible layouts of candidates. In an embodiment, candidates belonging to the same category are laid out in sequence, e.g., depending on their order of appearance in the text. It is to be appreciated that the preceding assignment is merely illustrative and, thus, other assignments can also be used, while maintaining the spirit of the present principles.

At step 302E, initially prune the family of trees. In an embodiment, the initial pruning can be performed by selecting the longest unique sequences that do not intersect other sequences and marking them as "valid", then removing any other sub-tree that becomes invalid due to this selection. It is to be appreciated that the preceding pruning methodology is merely illustrative and, thus, other pruning methodologies can also be used, while maintaining the spirit of the present principles.

At step 302F, further prune the family of trees. In an embodiment, the further pruning can be performed by selecting a sequence using a set of heuristics. In an embodiment, the heuristics can include, for example, but are not limited to, selecting the longest sequence with higher priority.

At the conclusion of the pruning phase, i.e., after step 302F, we have a valid assignment tree and a list of valid enumeration and/or bullet list entry points. These are laid out in space and in their nesting.

At step 302G, compute paragraph information. In an embodiment, paragraph information is computed by starting from the existing paragraphs (if available) and removing the enumeration/bullets from the paragraphs, eventually splitting them. Also, consider line feeds after an enumeration/bullet. For example, if sentence splitting can happen at a line feed, consider indentation of the following line. As another example, if a sentence is lower than the indentation of the enumeration/bullet, split the paragraph and take it outside the bullet entry.

At the conclusion of computing paragraph information (i.e., after performing step 302G), the text will have proper paragraph information that does not include enumeration and bullet list characters.

At step 304, split the text into sentences, and split the sentences into tokens (word, symbols, punctuation, digits), where each token is lemmatized and is assigned a part of speech using machine learning. In an embodiment, step 304 can be performed by text splitter 204.

At step 306, detect compound words and re-attach the compound words using pattern matching on Part of Speech (PoS) tags separated by symbols. For example a noun followed by a dash (-) followed by a noun is re-attached and assigned a noun PoS (e.g., nickel-cadmium). In an embodiment, step 306 can be performed by compound word detector 206.

At step 308, recognize contextual tokens through rule-based state machines, and annotate the candidates. In an embodiment, the candidates are annotated for date, time, Universal Resource Locator (URL), email addresses, and measurements. It is to be appreciated that the preceding annotations are merely illustrative and, thus, other annotations can also be used, while maintaining the spirit of the present principles. In an embodiment, step 308 can be performed by contextual token recognizer 208.

At step 310, detect and annotate other named entities like people names, organizations, and locations. The detection and annotation can be performed using a combination of methods. In an embodiment, such methods can be pre-existing methods such as machine learning, dictionary based, Finite State Machine (FSM), etc.). In an embodiment, step 310 can be performed by entity detector 210.

At step 312, assign a word sense to each word token present in the language dictionary. In an embodiment, step 312 can be performed by word sense assigner 212.

In an embodiment, if the target word is a noun, then step 312 can involve the following: fetch all possible definitions of the word and all the words (nouns, adjectives, verbs) that are around the target word; fetch all possible definitions of every word hypernym, hyponym and meronym; compute a gloss overlap score for each possible meaning of the target word and pick the sense with highest score; and check if the target word builds a compound word with the previous word(s). If the target word builds a compound word with the previous word(s) (e.g., "junk bonds"), then compute the score for the compound word itself and pick it if it is higher than the score for the single words.

In an embodiment, if the target word is a verb, then step 312 can involve the following: check if the target word builds a compound word with its surrounding words (e.g., "take over"). If the target word builds a compound word with the previous word, then replace the two (or more) tokens with a single verb token.

It is to be appreciated that this process samples words across the document for sense consistency. For example, if the word "stocks" appears 15 times, its sense will be computed every 4 occurrences and the sense that has highest score most of the time across the results is picked for every word.

In an embodiment, the resulting senses are stored locally in the computer system's cache which can store it as either "one sense for document" for short documents or "one sense for section" in longer documents. The scoring function can improve the accuracy of the sense determination, which can be a function of the amount of archived sense data in the cache, of which to calculate the relatedness of one sense to another.

At step 314, parse each sentence into a treebank parse tree (or any other parse tree) that detects noun phrases, adjective phrases, verb phrases, and so forth. It is to be appreciated that the fact that we perform word sense disambiguation (per step 312) before parsing (per step 314) means that we can properly consider compound words (such as "take over" or "junk bonds") and greatly enhance the precision of the sentence parser. In an embodiment, step 314 can be performed by sentence parser 214.

At step 316, compute a dependency graph across tokens starting from part of speech and parse tree; detect all predicates and assign a verb net frame on each of them; compute predicate arguments and assign their semantic role. It is to be appreciated that the fact that we perform word sense disambiguation (per step 312) before dependency parsing (per step 316) means that we can properly consider compound words (such as "take over") and greatly enhance the precision of the dependency parser. In an embodiment, step 316 can be performed by dependency graph calculator 216.

At step 318, generate all possible concept instance candidates along with parent-son relations through pattern matching and transformation of the parse tree. In an embodiment, step 318 can be performed by instance generator 218.

For example, the sub-tree (NP (JJ Optimal) (NN Dose), where in standard part-of speech tagging convention NP is a Noun Phrase, JJ is an adjective, and NN is a noun, creates two instances ("Dose" and "Optimal Dose"), and also a parent-son relation between them (an "Optimal Dose" is probably some kind of "Dose"). As another example, the sub-tree (NP (DT The) (ADJV (JJ Large) (CC and) (JJ heavy)) (NN dog)) creates three instances ("dog", "large dog" and "heavy dog") and appropriate parent son relations. Note that DT denotes a determiner, CC denotes a conjunction, and ADJV denotes an adjective phrase per part of speech tagging convention.

In an embodiment, step 318 can involve tagging each candidate regarding whether that candidate seems an "instance" or a "class" (e.g., a proper noun versus noun).

At step 320, group concept instances into concept candidates. This is done through a configurable expression between the actual text, the primary lemma (the one that seems most appropriate), the secondary lemmas (all other possible lemmas for the word) and the synonym set (synset) (when available). In an embodiment, step 320 can be performed by concept candidate identifier 220.

Concept candidate keys are a sequence of triplets (text, lemma, sunset). Candidates might refer to the same concept when their keys have the same length and each item satisfies the configured equality expression. The most used expressions are as follows:
- if two instances have the same synset they are the same candidate;
- if the two instances have no synset but have the same lemma they are the same candidate; and otherwise they are a different candidate.

It is to be noted that the instance candidate generation uses also the contextual tokens recognized in step 308 as follows: more specific candidates are generated by attaching dates, times or other composite annotation that appears immediately before and if a candidate would partially overlap with a composite annotation, then the candidate will be rejected.

At step 322, for each concept candidate that includes a single element in the key and that have a synset, search for hyponym relations with every other candidate. In an embodiment, step 322 can be performed by hyponym searcher 222.

At step 324 search for specific set of predicate detected in step 316 (such as, e.g., "is" "called", "include", and so forth), that have two mandatory arguments (A0 and A1) and no temporal, location, modal or other modifiers. Check if the two argument fall inside a concept candidate and build an instanceOf relation. In an embodiment, step 324 can be performed by predicate searcher 224.

At step 326, search for other patterns in the text that put concept candidates in relation. For example: "*candidate* such as *candidate*", "candidate" and "candidate" and create suitable instanceOf or subclassOf relations. In an embodiment, step 326 can be performed by pattern searcher 226.

At step 328, search for each predicate (detected in step 316) that has at least two mandatory arguments (such as A0 and A1 or A1 and A2, depends on the predicate frame). Check if the two argument fall inside a concept candidate and build a typed relation (e.g., "contains" or "sues"). Attach optional semantic arguments and modifiers to the relation. In an embodiment, step 328 can be performed by predicate searcher 224.

At step 330, arrange concept candidates in a tree by using subclassOf, hyponymOf and InstanceOf relations. Each candidate might appear in multiple places of the tree. In an embodiment, step 330 can be performed by concept candidate based tree former 230.

At step 332, create predicate-based relation links between tree nodes. In an embodiment, step 332 can be performed by predicate-based relation links generator 232.

At step 334, assign a score to each node based on certain criteria. In an embodiment, the criteria can include one or more of the following: how many times the node appears in the text; how many times the node appears in predicate-based relations; and how many children the nodes have. In an embodiment, step 334 can be performed by node scorer 234.

At step 336, sort nodes based on score and mark the top X %. Also, "close the tree" by picking every parent of marked nodes. In an embodiment, step 330 can be performed by node sorter 236.

At step 338, decide which nodes are classes or individuals. In an embodiment, a node is determined to an individual of the nodes has no class children and (has more incoming instanceOf relations than SubclassOf relation or has more candidate instances marked as "individual" then not marked. In an embodiment, step 330 can be performed by node classifier 238.

At step 340, rebalance the tree. In an embodiment, step 340 can involve aggregating sub-trees that include only individuals under the same parent and the use of other heuristics to make the overall output more "user friendly" (e.g. not too many classes, group by similarity or Soundex, and so forth). In an embodiment, step 330 can be performed by tree rebalance 240.

At step 342, export the output in a Resource Description Framework (RDF) format, including unmarked (noise node). In an embodiment, step 330 can be performed by output exporter 242.

The user interface allows for editing the RDF output graph and to focus on marked nodes. The user operations can include, for example, but are not limited to the following: "adding" a new (manual) node by specifying its text, lemma and eventually a synset from the lexical database WordNet; "removing" a node (the node is not actually removed but it is marked "deleted"); "moving" nodes/sub-trees across parent-son hierarchy (this actually makes a copy and marks the original nodes as "deleted"; creating new relations across nodes; and removing existing relation edges.

Once the user is happy with the ontology he can repeat the automatic discovery process by adding more information on top of his manually edited ontology.

Every manual change recorded (e.g. new manual nodes, deleted nodes, etc.) is preserved by the procedure that will place new information according to the manual edits already done.

The present principles provide an automated ontology construction, which has the following advantages, compared to existing methods.

(1) The present principles enable documents that include text in any format to be ingested, processed and automatically read, without restrictions of a specific file format, volume of text, or domain.

(2) The present principles provide a way to remove enumeration and list headers to facilitate the processing of information.

(3) The present principles provide a method to discriminate relevant predicates to produce important relations across concepts depending on the specific domain.

(4) The present principles provide a method of "class/individual" graph building that provides relationships based on entities being "instances of" and/or "hyponyms of" and/or "subclasses of" one another.

(5) The present principles provide a way to rank the importance of nodes and determine the sensitivity to class discovery, based on the occurrence and relevance of the specific node (e.g., how many "children" the node has, etc.).

(6) The present principles provide a way to transform and group nodes into classes and individuals to facilitate comprehension.

(7) The present principles do not rely upon pre-determined ontology patterns for ontology building.

(8) The present principles do not require specifying a complete list of all the entities that will need to be included in the ontology.

These and other advantages of the present principles are readily ascertained by one of ordinary skill in the art given the teachings of the present principles provided herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
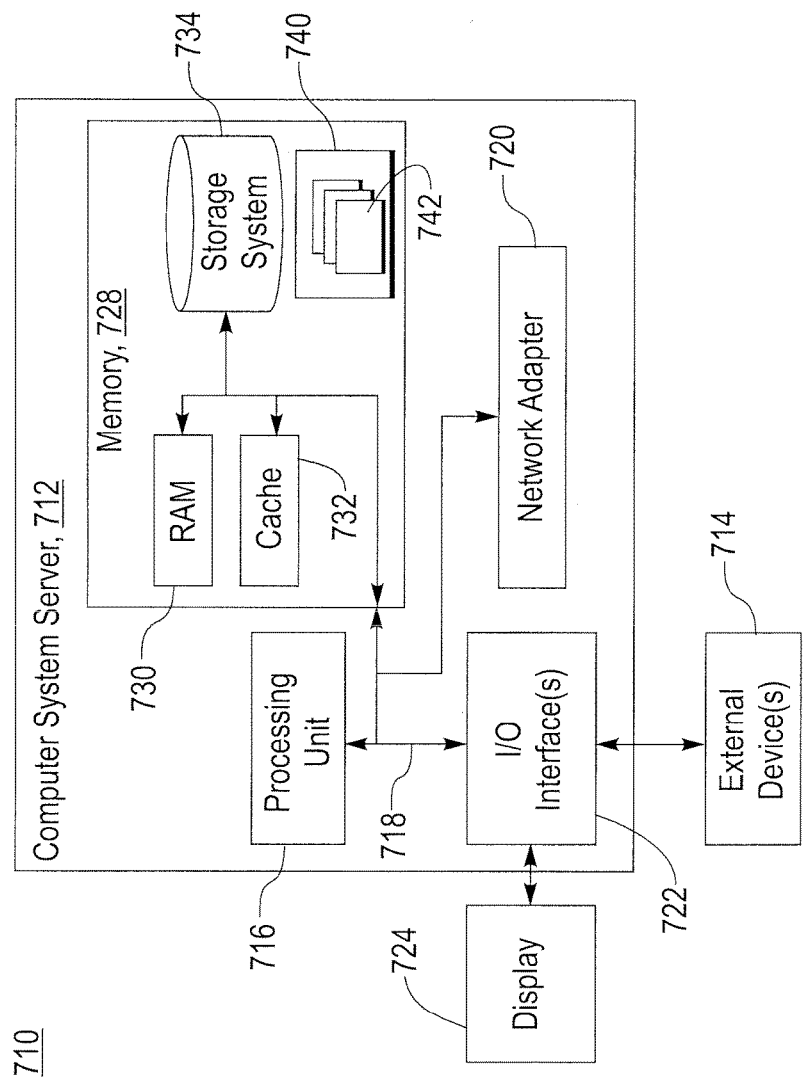
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
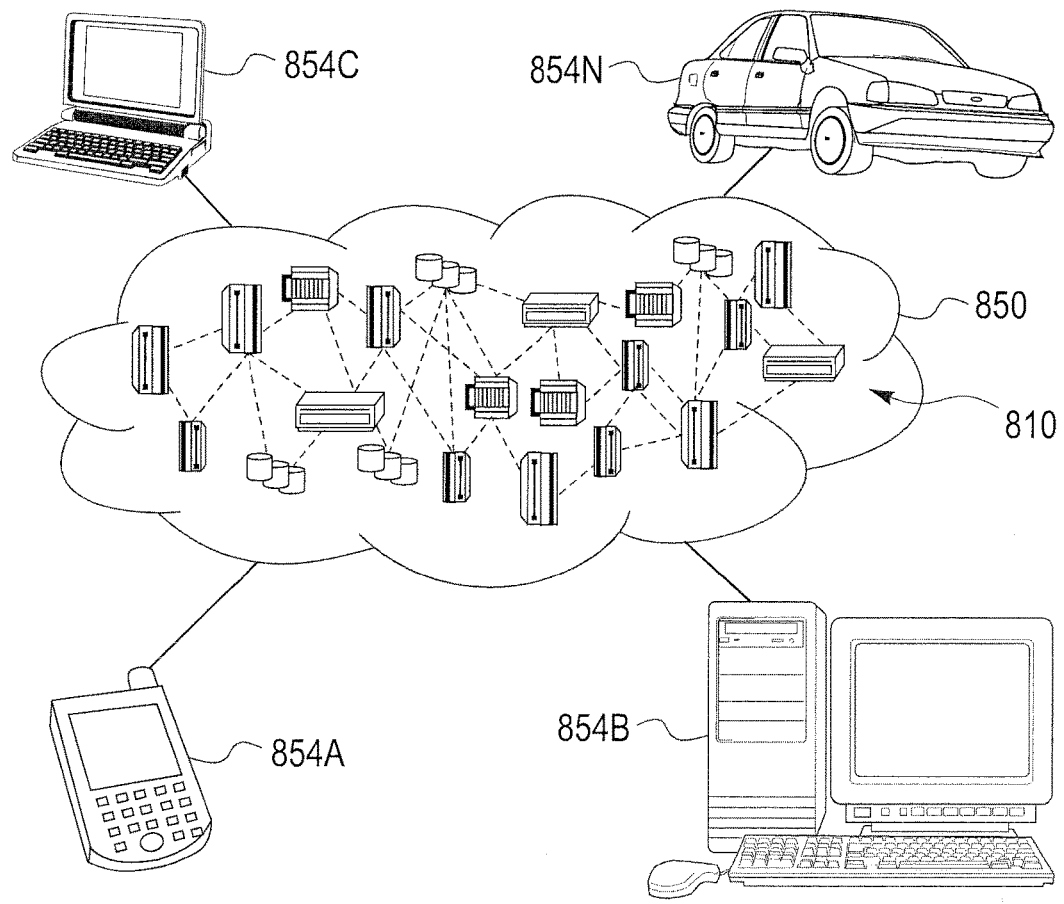
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
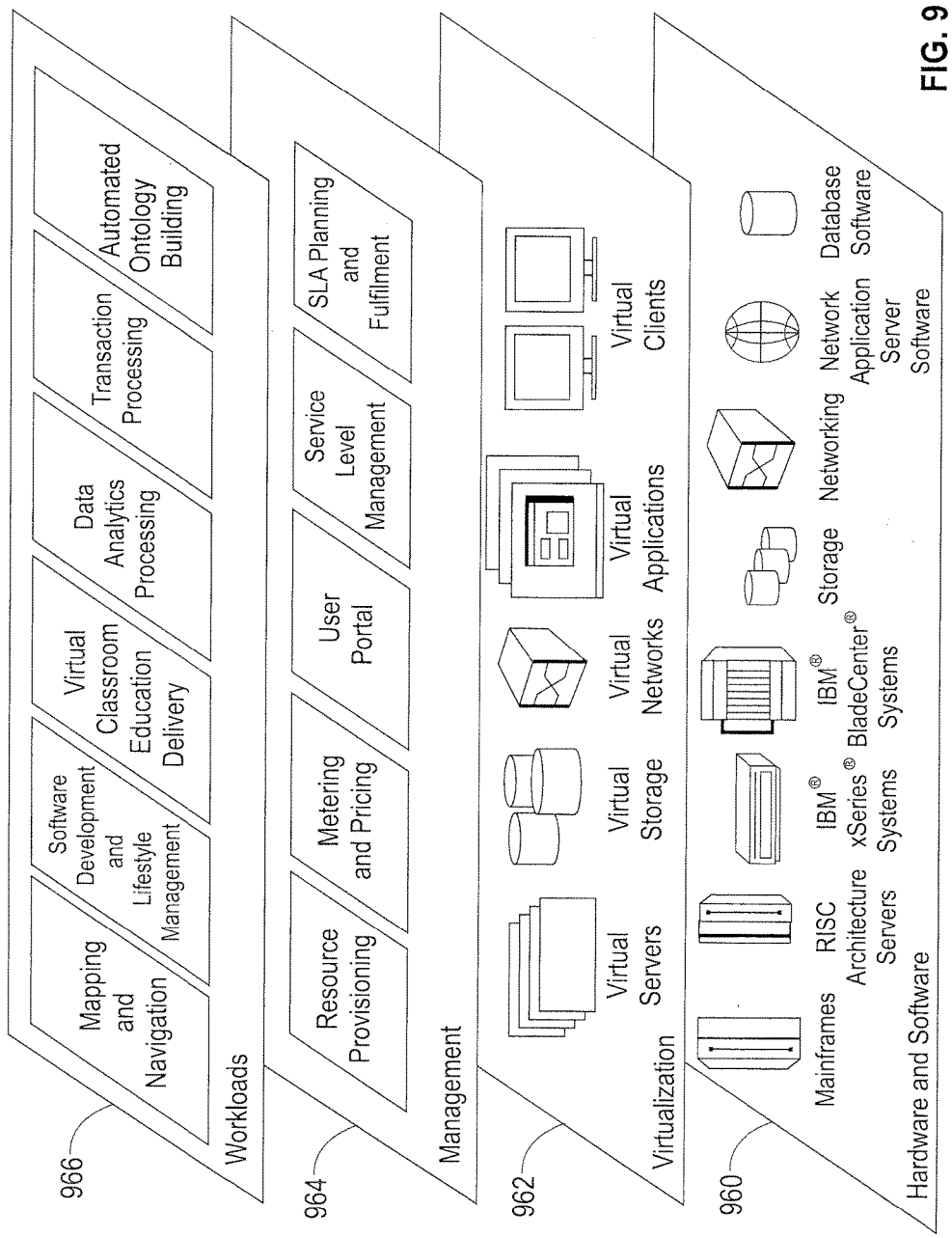
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated ontology building.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for automated ontology building, comprising:
   creating, from text, contextual tokens representing at least one of date and time;
   calculating a dependency graph across the contextual tokens using at least one parse tree obtained by parsing the text;
   generating concept instance candidates and parent-child relationships based on pattern matching and transformation of the at least one parse tree;
   grouping concept instance candidates into concept candidates using concept candidate keys, the concept candidate keys being a sequence of triplets;
   arranging the concept candidates into a tree having tree nodes and creating predicate-based relationships between the tree nodes based on patterns and predicates identified in the text;
   scoring and sorting the tree nodes;
   performing an analysis of the tree nodes and rebalancing the tree based on the analysis to provide an ontology based on the text and formed as an output graph comprising a plurality of nodes; and
   providing a user interface for editing the ontology by selectively choosing from a plurality of options including adding a new node to the output graph, removing an existing node from the output graph, moving one of the plurality of nodes or a sub-graph across a parent-child hierarchy in the output graph, creating a new relation across the plurality of nodes, and removing an existing relation edges from the output graph.

2. The method of claim 1, further comprising:
   analyzing the text to determine enumeration candidates therein based on a set of rules;
   categorizing and assigning priority values to the enumeration candidates;
   computing assignment trees for the enumeration candidates to obtain a plurality of admissible candidate layouts; and
   pruning the enumeration candidates from the text based on the plurality of admissible candidate layouts and the priority values.

3. The method of claim 1, wherein said step of creating the contextual tokens from the text comprises annotating the text using rule-based state machines.

4. The method of claim 1, wherein said step of generating the concept instance candidates and the parent-child relationships comprises tagging words in the at least one parse tree as an applicable one of an instance or a class.

5. The method of claim 1, wherein the concept instance candidates are grouped responsive to a configurable equality expression between the text and at least one lemma.

6. The method of claim 5, wherein the configurable equality expression comprises a synonym set.

7. The method of claim 1, wherein the concept instance candidates are grouped responsive to the contextual tokens.

8. The method of claim 1, wherein the predicates are determined responsive to the dependency graph.

9. The method of claim 1, wherein the concept candidates are arranged into the tree using subclassOf, hyponymOf, and instanceOf relations.

10. The method of claim 1, wherein a given node from among the tree nodes is scored based on a number of children of the given node, a number of times the given node appears in the text, and a number of times the given node appears in the predicate-based relationships.

11. The method of claim 1, wherein the predicates in the text identified by said identifying step consist of predicates having at least two mandatory arguments.

12. The method of claim 1, wherein the at least one parse tree detects applicable parts of speech of the text.

13. The method of claim 1, wherein each of the concept instance candidates are assigned a priority value based on the contextual tokens.

* * * * *